United States Patent [19]

Dawber

[11] 3,746,030
[45] July 17, 1973

[54] CONTROL SYSTEM FOR GAS PRESSURE REGULATING APPARATUS

[75] Inventor: Edmund Norman Dawber, Market Drayton, England

[73] Assignee: Serck Industries Limited, Birmingham, England

[22] Filed: Sept. 8, 1971

[21] Appl. No.: 178,676

[52] U.S. Cl. .............................................. 137/110
[51] Int. Cl. ......................................... G05d 16/16
[58] Field of Search.................... 137/109, 110, 111, 137/112

[56] References Cited
UNITED STATES PATENTS
3,213,875   10/1965   Spence................................ 137/110

Primary Examiner—Robert G. Nilson
Assistant Examiner—Edward Look
Attorney—Holman & Stern

[57] ABSTRACT

A control system for a pair of parallel pressure regulators which are together in series in a gas conduit includes a pair of shut-off valves immediately upstream of the respective regulators, the valves being actuable in response to signals from a pair of devices which are themselves operable at a pair predetermined pressures of the gas downstream of the regulators. Each one of the valves has a detector which can control the other of the valves so that when one valve is shut the other valve is urged open.

10 Claims, 2 Drawing Figures

INVENTOR
Edmund Norman Dawber

CONTROL SYSTEM FOR GAS PRESSURE REGULATING APPARATUS

This invention relates to control systems for gas pressure regulating apparatus, and has as an object to provide such a system in a convenient form.

According to the invention a control system for a gas pressure regulating apparatus which includes a gas supply conduit, a pair of pressure regulators connected in parallel with each other and in series with the conduit and a pair of shut-off valves immediately upstream of the respective pressure regulators comprises a pair of pressure sensing means respectively operable at first and second predetermined values of pressure downstream of the regulators to provide first and second control signals respectively, a pair of actuators respectively operable to shut the said valves, a pair of control means for the respective actuators, each control means being operable by a selected one of the said control signals to cause the associated actuator to shut the associated valve, a pair of detector means respectively associated with the valves, the detector means for a selected one of the valves being operatively connected to the control means for the other of the valves whereby when the said one valve is shut the control means for the other valve is urged to cause the other valve to open.

An example of a control system according to the invention will now be described with reference to the accompanying drawings in which.

Figure 1:
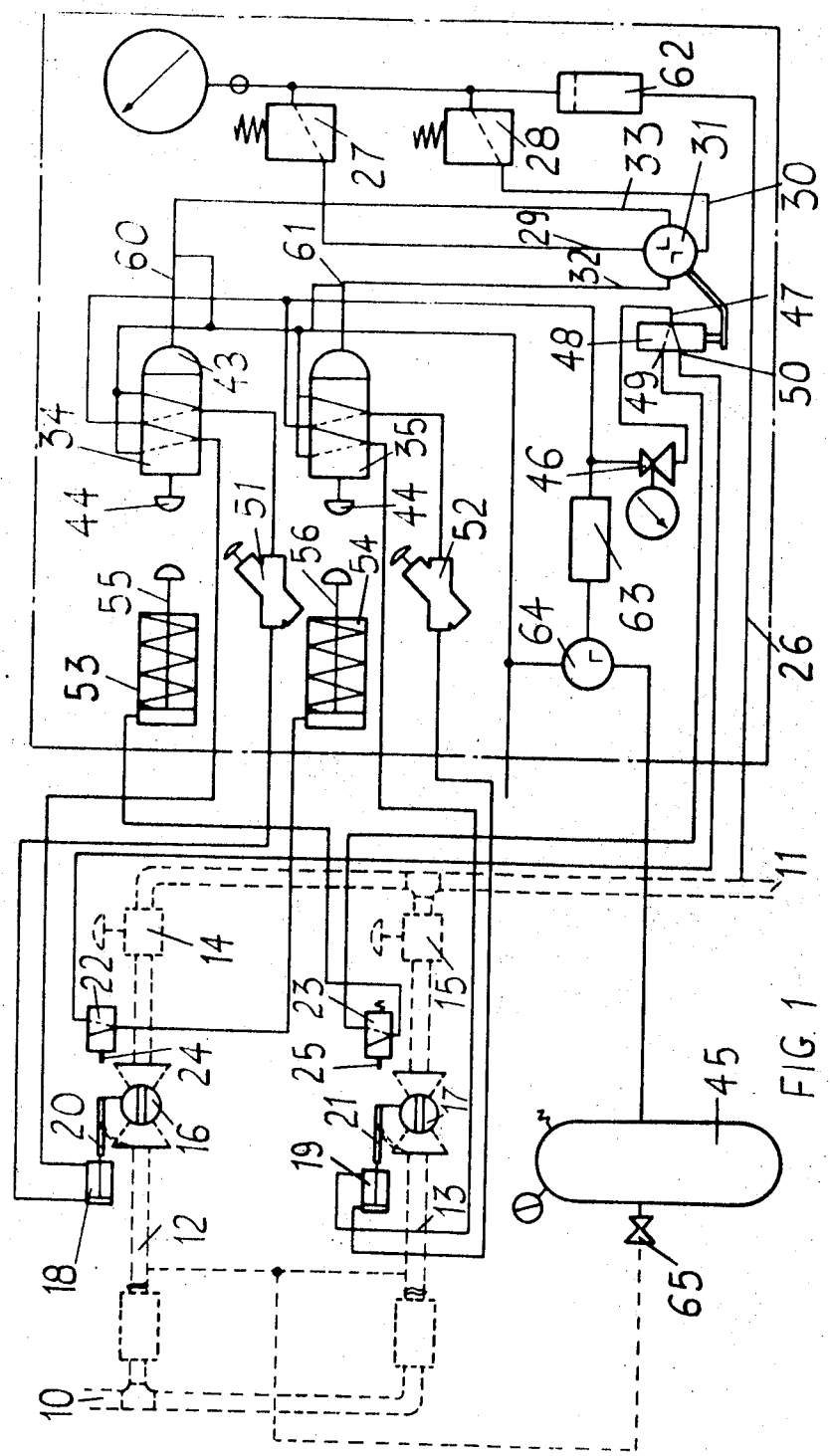
FIG. 1 is a diagram of the control system.

A gas conduit has an inlet 10 and an outlet 11 between which are a pair of parallel passages 12, 13. A pair of gas-pressure regulators 14, 15 are connected in series with the respective passages 12, 13 and a pair of valves 16, 17 are sited in the respective passages 12, 13 upstream of the regulators 14, 15. Valves 16, 17 are operable by actuators in the form of double-acting piston and cylinder units 18, 19, which respectively include cam portions 20, 21. Spring loaded pilot valves 22, 23 have plungers 24, 25 operable by the respective cam portions 20, 21 so that when the valves 16, 17 are shut the respective valves 22, 23 are open.

A pipe 26 includes a filter and communicates with the gas conduit downstream of the outlet 11. A pair of spring-loaded, pressure responsive valves 27, 28 are connected in parallel between the pipe 26 and connections 29, 30 of a selector valve 31. Valve 31 has a further pair of connections 32, 33 and is movable between a first position in which connections 29, 30 respectively communicate with connections 33, 32 and a second position in which connections 29, 30 respectively tively communicate with connections 32, 33.

Figure 2:
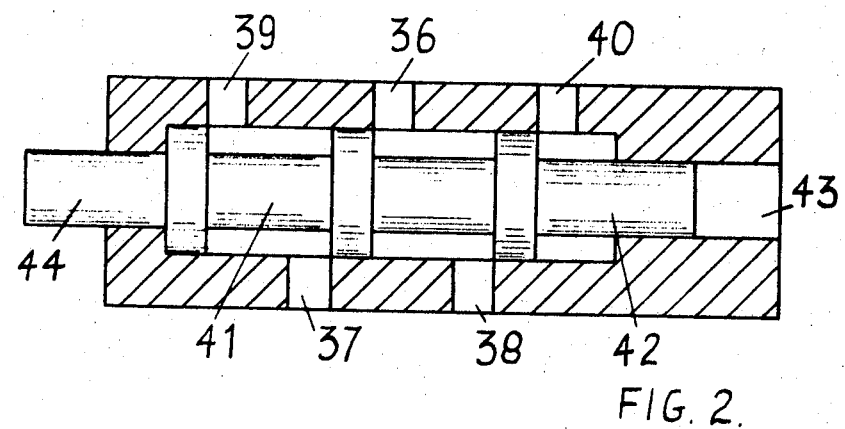
FIG. 2 shows diagrammatically one of the valves of the system shown in FIG. 1.

A pair of control valves 34, 35 are respectively associated with the piston and cylinder units 18, 19 and each comprises, as shown in FIG. 2 an inlet port 36, a pair of outlet ports 37, 38 and a pair of vent ports 39, 40. Associated with the ports is a spool-type plunger 41 which includes a piston portion 42 within a cylinder 43 integral with the control valve. Plunger 41 is movable between a position in which ports 36, 37 respectively communicate with ports 38, 39 and a position in which ports 36, 38 respectively communicate with ports 37, 40. Plunger 41 has an axially extending abutment 44.

Ports 37 of control valves 34, 35 are connected to the associated units 18, 19 in such a way that a high pressure at these ports will cause the valves 16, 17 to be shut. Similarly a high pressure at ports 38 of valves 34, 35 will cause the respective valves 16, 17 to be opened. Variable fluid flow restrictors 51, 52 are connected between the ports 38 and the respective units 18, 19. Cylinders 43 of valves 34, 35 respectively communicate with connections 33, 32 of selector valve 31. Ports 36 of valves 34, 35 communicate via a filter 63 and a three way valve 64 with a reservoir 45 of gas under pressure. Reservoir 45 is supplied via a pressurere reducing valve 65 from inlet 10.

The pressure source 45 also connects, via a reducing valve 46, with an inlet 47 of a further selector valve 48 which also has a pair of outlets 49, 50. Valve 48 is operable between a position in which inlet 47 communicates with outlet 49 and a position in which inlet 47 communicates with outlet 50. Valve 48 is, more over, linked with selector valve 31 for simultaneous manual operation, so that the position of valve 48 in which inlet 47 and outlet 49 communicate corresponds to the position of valve 31 in which connections 29, 33 and connections 30, 32 communicate. Outlets 49, 50 of selector 48 communicate via pilot valves 23, 22 respectively with cylinders 53, 54 within which associated pistons 55, 56 are slidable to engage abutments 44 on the control valves 34, 35.

In use, the pressure regulators 14, 15 are responsive to the gas pressure downstream thereof, so as to become operative when this downstream pressure falls below a predetermined value. Pressure responsive valves 27, 28 are operable at predetermined levels of pressure in the pipe 26 to allow gas to pass to the selector valve 31. One of the valves 27, 28 in this example valve 28, is adjusted to operate at a slightly higher pressure level than the other valve.

Initially both valves 16, 17 are open but only one of the regulators, for example regulator 14 is operating to control gas pressure, the other regulator 15 being adjusted to become operative when the regulated gas pressure falls to a level below that supplied by regulator 14. While inoperative the regulator 15 acts effectively to shut off gas flow through passage 13.

With the selector valve 31 in the position shown, should the regulated gas pressure increase above the operating level of valve 27, this pressure will be supplied to the cylinder 43 of control valve 34, and the pressure supplied from the source 45 will then pass via ports 36, 38 of the valve to cause unit 18 to shut valve 16. The abutment 44 of valve 34 displaces the associated piston 55 to the left as seen in the drawings. There is at this time no pressure in the cylinder 53 to oppose operation of valve 34 because, although selector valve 48 is in a position at which pressure is supplied from the source 45 to the pilot valve 23, valve 23 is shut because valve 17 is open.

When valve 16 shuts the pressure downstream of regulators 14, 15 falls. When this pressure reaches the level at which regulator 15 becomes operative, gas flows through the passage 13. Regulator 15 is then acting as a stand-by pressure control. Valve 27 shuts off and the pressure in cylinder 43 of valve 34 bleeds away through a bleed orifice 60. A similar bleed orifice 61 is associated with the valve 35. Should the regulated gas pressure continue to rise to a level at which valve 28 operated, the control valve 35 will be operated in a like manner to valve 34 and cause actuator 19 to shut valve 17. At this stage both valves 16, 17 are therefore shut, However, action of the cam portion 21 when valve 17 shuts causes pilot valve 23 to be opened and pressure applied to the cylinder 53. Piston 55 moves the control valve 34 so as to cause unit 18 to reopen valve 16. Regulation 14 thus resumes control of the gas pressure.

If, in these circumstances, gas pressure at outlet 11 continues to rise to a level at which valve 27 remains operated the increased pressure in cylinder 43 of control valve 34 will overcome the bias applied by the pressure in cylinder 53 and valve 16 will shut again. Pressure in outlet 11 will fall to a point at which valve 27 shuts and valve 16 re-opens. The system will continue to hunt and the gas pressure at outlet 11 will be regulated by the mark-space ratio of the operation of valve 16.

Movement of the selector valves 31, 48 to the alternative position causes the above-described roles of the valves and regulators associated with the respective passages 12, 13 to be reversed.

I claim:

1. A control system for a gas pressure regulating apparatus which includes a gas supply conduit, a pair of pressure regulators connected in parallel with each other and in series with the conduit and a pair of shut-off valves immediately upstream of the respective pressure regulators, comprising a pair of pressure sensing means respectively operable at first and second predetermined values of pressure downstream of the regulators to provide first and second control signals respectively, a pair of actuators respectively operable to shut the said valves, a pair of control means for the respective actuators, each control means being operable by a selected one of the said control signals to cause the associated actuator to shut the associated valve, a pair of detector means respectively associated with the valves, the detector means for a selected one of the valves being operatively connected to the control means for the other of the valves whereby when the said one valve is shut the control means for the other valve is urged to cause the other valve to open.

2. A system as claimed in claim 1 which includes a first selector device operable in one condition to supply said first and second control signals respectively to first and second ones of said control means, and in a second condition to supply said first and second control signals respectively to said second and first control means.

3. A system as claimed in claim 2 which includes a second selector device operable to selectively energise the detector means.

4. A system as claimed in claim 3 in which said first and second selector devices coact so as, in use, to energise the one of the detector means which is connected to the control means associated with whichever of the pressure sensing means is operable at the higher pressure.

5. A system as claimed in claim 1 in which the pressure sensing means are pressure-responsive valves and the first and second control signals are pressure signals derived from the gas in the said conduit.

6. A system as claimed in claim 1 in which the said actuators are double-acting piston andcy cylinder units.

7. A system as claimed in claim 1 in which the detection means comprise valves operable by said actuating means, when the associated shut-off valves are shut, to apply a fluid pressure to the associated control means.

8. A system as claimed in claim 7 in which each control means comprises a spool control valve operable to supply signal pressures to the associated actuator and a single-acting piston and cylinder unit, the piston of said single-acting unit being movable by the spool of the associated control valve, against the fluid pressure applied by the associated detector, when the control valve is operated by a control pressure signal.

9. A system as claimed in claim 8 in which each said single-acting piston and cylinder unit is operable by the said fluid pressure to urge the associated control valve to a position which opens the shut-off valve associated with that control valve.

10. A system as claimed in claim 9 which includes a pair of variable fluid flow restrictors between the respective control valves and their associated actuators.

* * * * *